(12) United States Patent
Suzuki et al.

(10) Patent No.: US 6,815,861 B2
(45) Date of Patent: Nov. 9, 2004

(54) ELECTRIC ROTARY MACHINE WITH ARMATURE OF DISCRETE SALIENT POLE STRUCTURE

(75) Inventors: Yuzuru Suzuki, Shizuoka-ken (JP); Seiichi Matsuura, Shizuoka-ken (JP); Sakae Fujitani, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 34 days.

(21) Appl. No.: 10/352,827

(22) Filed: Jan. 28, 2003

(65) Prior Publication Data

US 2003/0141781 A1 Jul. 31, 2003

(30) Foreign Application Priority Data

Jan. 31, 2002 (JP) ........................................ 2002-024251

(51) Int. Cl.[7] ............................ H02K 1/18; H02K 1/14
(52) U.S. Cl. ..................................................... 310/218
(58) Field of Search ................................. 310/216, 217, 310/254, 218, 42, 259

(56) References Cited

U.S. PATENT DOCUMENTS

| | | | | |
|---|---|---|---|---|
| 2,607,816 A | * | 8/1952 | Ryder et al. | 310/42 |
| 3,809,938 A | * | 5/1974 | Sjoberg et al. | 310/254 |
| 5,095,610 A | * | 3/1992 | Schultz et al. | 29/596 |
| 6,107,718 A | * | 8/2000 | Schustek et al. | 310/218 |
| 6,166,468 A | | 12/2000 | Suzuki et al. | |
| 6,313,557 B1 | * | 11/2001 | De Filippis et al. | 310/216 |
| 6,448,685 B1 | * | 9/2002 | Mayer et al. | 310/254 |

FOREIGN PATENT DOCUMENTS

| | | |
|---|---|---|
| FR | 2 488 749 | 2/1982 |
| JP | 2001-238377 | 8/2001 |

OTHER PUBLICATIONS

Patent Abstracts of Japan, vol. 1999, No. 09, Publication No. 11098724; Publication Date: Apr. 9, 1999.
Patent Abstracts of Japan, vol. 1996, No. 11, Publication No. 01896061; Publication Date: Jul. 30, 1996.

* cited by examiner

Primary Examiner—Tran Nguyen
(74) Attorney, Agent, or Firm—Fay, Sharpe, Fagan, Minnich & McKee, LLP (57) ABSTRACT

An electric rotary machine comprises: a cylindrical pole tooth ring provided with a plurality of slits; and a plurality of salient poles each including a pole tooth. The salient poles are each positioned and fixed such that the pole tooth is fitted into the slit, which, by means of openings formed on the pole tooth ring along and close to the side wall of the slit, is adapted to be elastically deformed when receiving the pole tooth fitted thereinto.

3 Claims, 9 Drawing Sheets

ELECTRIC ROTARY MACHINE WITH ARMATURE OF DISCRETE SALIENT POLE STRUCTURE

BACKGROUND OF THE INVENTION

1. Field of the Invention

The present invention relates to an electric rotary machine (hereinafter referred to as "rotary machine," or occasionally "motor" as appropriate), and more particularly to a radial gap type rotary machine comprising an armature with independent salient poles.

2. Description of the Related Art

In a conventional rotary machine including an armature structured such that a plurality of ring-shaped yoke pieces, which are made of a soft magnetic plate, such as a silicon steel plate, and which each have a plurality of pole tooth portions protruding radially, are stacked in the axial direction, since each of the ring-shaped yoke pieces is punched out integrally with the plurality of pole tooth portions as a single piece (the armature composed of the ring-shaped yoke pieces thus structured is hereinafter referred to as "integral armature" as appropriate), pole teeth each composed of a stack number of pole tooth portions are not partitioned structurally and therefore a resultant armature will have superior magnetic efficiency (low reluctance). However, in a small rotary machine, since a wire is usually wound directly on the pole teeth, the integral armature makes the winding operation troublesome, and extremely troublesome when the rotary machine is of inner rotor type. As a result, the winding operation takes a long time, and the winding incurs unsatisfactory space factor as well. And, due to the flyer-winding involved in this case, the wire is subject to torsional stress during the winding operation, thereby failing to ensure reliability of the winding area.

Under the circumstances above described, a rare earth magnet having high energy product has been developed recently, and the structure of a rotary machine can be reviewed by means of magnetic circuit analysis using a computer. This works to enable a rotary machine with an armature of discrete salient pole structure (this armature is hereinafter referred to as "discrete armature" as appropriate) to obtain requisite motor characteristics. The rotary machine with the discrete armature may give some undesired increase in reluctance but offers great advantages of easier winding operation and increased space factor of winding so as to override the disadvantageous increase in reluctance. From this, it is now realized that the rotary machine with the discrete armature produces higher performance and is manufactured less expensively on the whole, and there is a growing demand for the discrete armature.

One example of the discrete armature is manufactured such that pole tooth portions are dismembered off its main body portion of an integral armature, a wire is wound around each of the dismembered pole tooth portions thereby constituting each salient pole portion, and that the pole tooth portions each with a wire wound therearound, namely, the salient pole portions are rejoined to the main body portion by laser-welding, or the like.

The armature thus structured, however, has a disadvantage that the integral armature has to be first sectioned and later reassembled, thereby requiring an additional time. Also, when the pole tooth portions each with a winding (namely salient poles) are rejoined to the main body portion, the stack layers of the both portions have to be matched with each other, and therefore it is required that respective portions be held together by a well-maintained tool and surely welded plate by plate for ensuring precision, which results in decreased workability. And, joints (welded portions) deteriorate significantly in mechanical strength and magnetic characteristics.

To overcome the above described problems, the present inventors disclosed in Japanese Patent Application Laid-open No. 2001-238377 a radial gap type rotary machine comprising: a discrete armature including a plurality of discrete salient poles and a cylindrical pole tooth ring for positioning and fixing the salient poles, thereby connecting the salient poles to one another magnetically and mechanically; and a cylindrical stator ring adapted to decrease leakage flux resulting from magnetic discontinuity.

Figure 1:
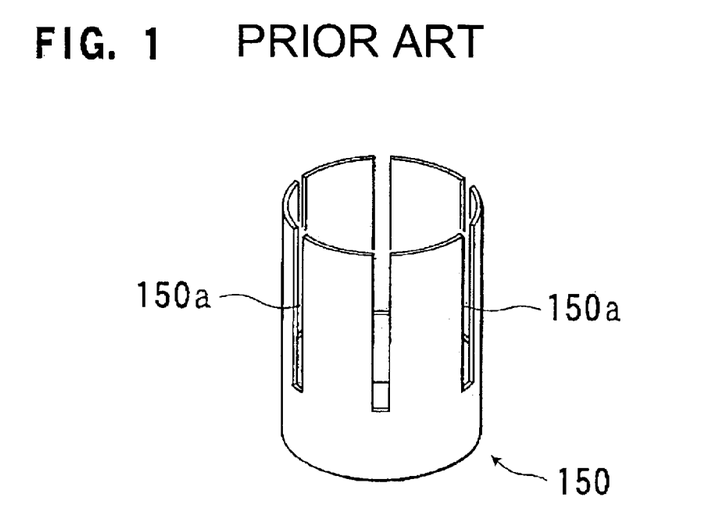
FIG. 1 is a perspective view of a pole tooth ring of a conventional rotary machine.

FIG. 1 shows a pole tooth ring 150 of the rotary machine disclosed in the above mentioned Japanese Patent Application Laid-open No. 2001-238377. The pole tooth ring 150 is of a soft magnetic steel plate and is produced, for example, by the process of drawing. The pole tooth ring 150 has six slits 150a shaped substantially rectangular, extending axially (in parallel to a shaft of a rotor) from its one axial end beyond its halfway point and arrayed circumferentially at even intervals. The slits 150a do not necessarily have to be arrayed at even intervals.

Pole teeth of salient poles are fitted into respective slits 150a, whereby the salient poles are appropriately positioned. And, a stator ring made of a steel plate in a hollow-cylindrical configuration is disposed over the pole tooth ring 150, thereby forming a magnetic circuit.

The rotary machine disclosed in the above Japanese Patent Application Laid-open No. 2001-238377 has the following problem. The slits 150a are produced by punching, so their width is determined to the dimension of the punching die and comes out with very little variation. On the other hand, the pole teeth to be fitted into the slits 150a are produced by stacking magnetic steel plates, and the thickness of each of the plates stacked adds up to the thickness of the pole tooth, thus the variation of the pole tooth thickness can be as large as the variation of one plate thickness multiplied by the stack number. Accordingly, it can happen that the condition of contact between the side wall of the slit 150a and the pole tooth is not kept constant.

For example, in case of a rotary machine with a diameter of 42 mm, the variation of the slit width is ±0.03 mm, while the variation of the pole tooth thickness is gained by multiplying ±0.02 mm (the variation of each plate with a thickness of 0.5 mm) by 7 (the stack number) amounting to as large as ±0.14 mm. This large variation sometimes makes it impossible for the pole tooth to fit into the slit, or causes the pole tooth to make unstable contact or even no contact with the side wall of the slit with regard to the slit width direction.

If the pole tooth does not make stable contact with the side wall of the slit, that is, with the pole tooth ring, the magnetic circuit at the stator is not stable, thereby causing the rotary machine to rotate unstably generating vibrations and noises. This renders the rotary machine unsuitable for precision instruments.

SUMMARY OF THE INVENTION

The present invention has been made in view of the above described problems, and its object is to provide a rotary machine, in which a stable contact is ensured between a pole tooth ring and pole teeth thereby obtaining stable motor characteristics.

In order to achieve the above object, according to a first aspect of the present invention, a rotary machine comprises:

a pole tooth ring provided with a plurality of slits; and a plurality of salient poles each including a pole tooth, and each positioned and fixed such that the pole tooth is fitted into the slit adapted to be elastically deformed when receiving the pole tooth fitted thereinto.

According to a second aspect of the present invention, in the rotary machine of the first aspect, the slit is configured so as to generate elasticity acting against the pole tooth fitted into the slit.

According to a third aspect of the present invention, in the rotary machine of the second aspect, the elasticity is generated by means of at least one opening provided along at least one side wall of the slit and resultant wavy portion of the at least one side wall.

According to a fourth aspect of the present invention, in the rotary machine of the second aspect, the elasticity is generated by means of at least one opening provided along one side wall of the slit and continuous with the slit.

Accordingly, in the rotary machine of the present invention, when the pole tooth is fitted into the slit, the variation of the pole tooth thickness can be absorbed by the elasticity provided at the side wall of the slit, whereby a stable contact is ensured between the pole teeth of the salient poles and the side wall of the slit, that is, the pole tooth ring, and therefore a stable magnetic circuit is formed ensuring stable motor characteristics.

BRIEF DESCRIPTION OF THE DRAWINGS

FIGS. 6A to 6C in combination constitute an exploded perspective view of an armature assembly of the rotary machine of the first embodiment, wherein

DESCRIPTION OF THE PREFERRED EMBODIMENTS

Preferred embodiments will hereinafter be described in detail with reference to the drawings. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

Figure 2:
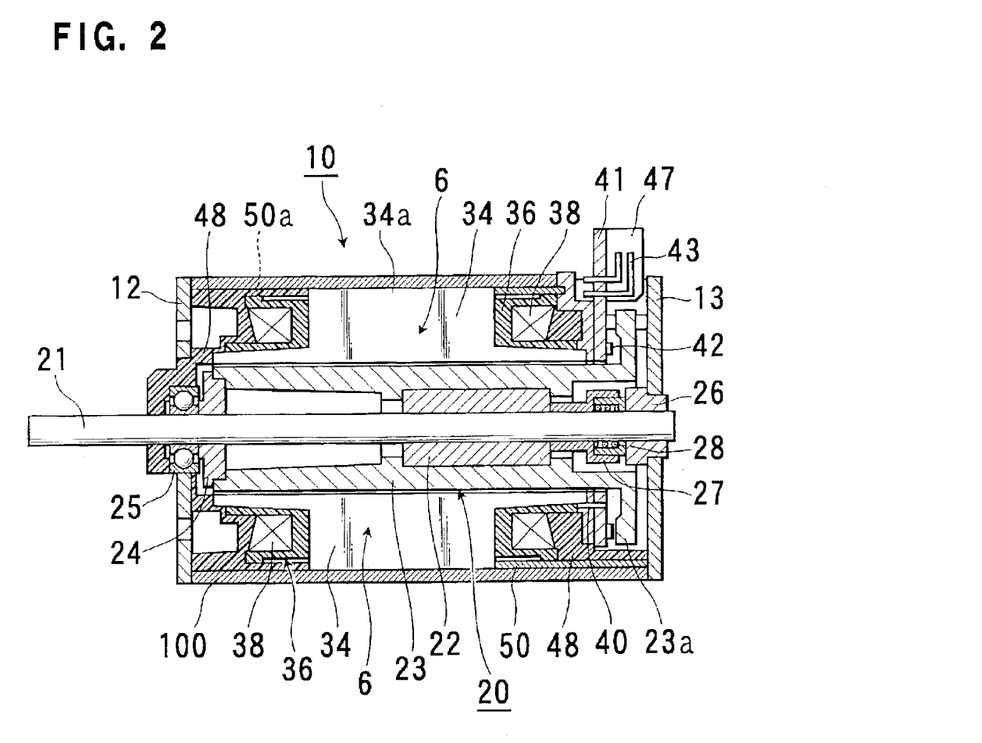
FIG. 2 is a cross-sectional view of a rotary machine according to a first embodiment of the present invention taken along its axial direction.
Figure 3:
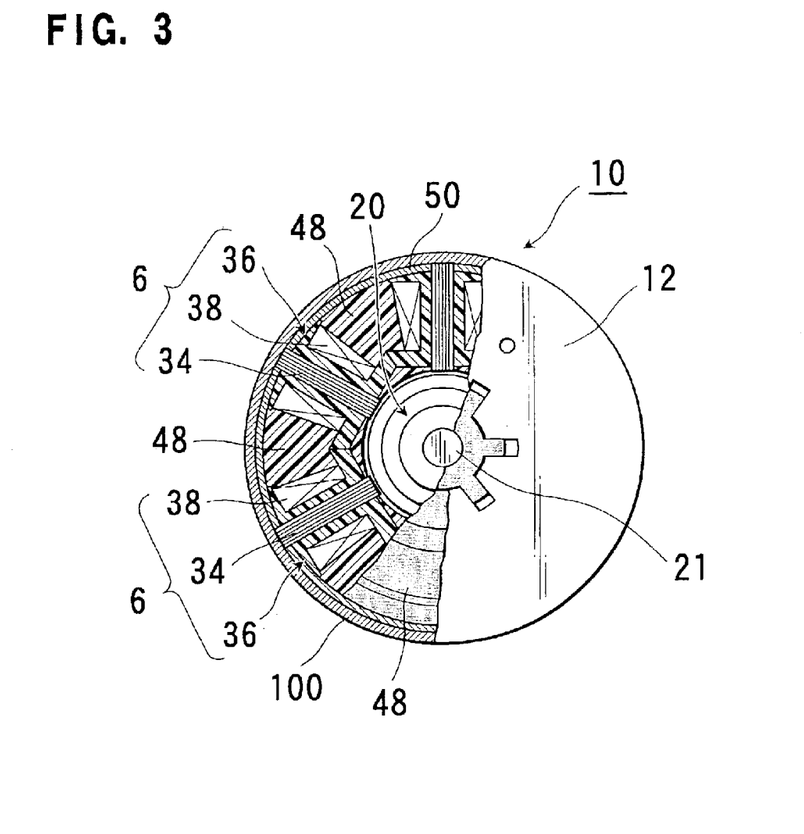
FIG. 3 is a cross-sectional view of the rotary machine of FIG. 2 taken along its radial direction.

FIGS. 2 and 3 show a structure of a three-phase inner rotor type brushless DC motor with six salient poles and eight rotor magnetic poles, as an embodiment of the present invention, wherein illustrated are: salient poles 6, an armature assembly 10, flanges 12 and 13, a rotor assembly 20, a shaft 21, a sleeve 22, a rotor field magnet 23, a rotor position detecting magnet 23a, a spacer 24, a ball bearing 25, a sleeve bearing 26, a preload spring holder 27, a preload spring 28, pole teeth 34, pole tooth end portions 34a, bobbins 36, magnet wires 38, terminal pins 40, a printed circuit board 41, a Hall sensor 42, connector terminals 43, a connector 47, a molding resin 48, a cylindrical pole tooth ring 50, pole tooth ring slits 50a, and a cylindrical stator ring 100.

The embodiment here refers to a so-called integrally resin-molded armature assembly structured such that a resin is filled inside an armature assembly except a portion where a rotor field magnet is received.

The brushless DC motor generally comprises: the armature assembly 10; the two flanges 12 and 13 arranged respectively at both axial ends of the armature assembly 10; and the rotor assembly 20 rotatably disposed inside the armature assembly 10.

The armature assembly 10 includes: the stator ring 100 as its outer circumference; the pole tooth ring 50 disposed on the inner circumferential surface of the stator ring 100; and six salient poles 6 disposed inside the pole tooth ring 50 at an even angle interval of 60 degrees and extending radially.

Figure 4A:
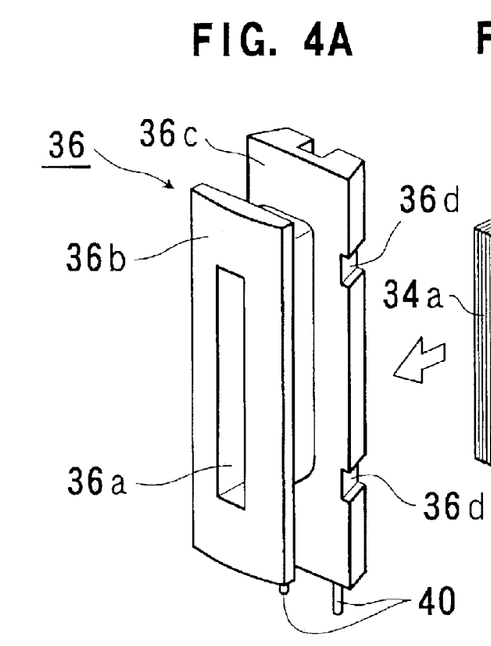
FIGS. 4A and 4B in combination constitute an exploded perspective view of a salient pole (omitting a coil) shown in FIGS. 2 and 3, respectively showing a bobbin and a pole tooth.
Figure 4B:
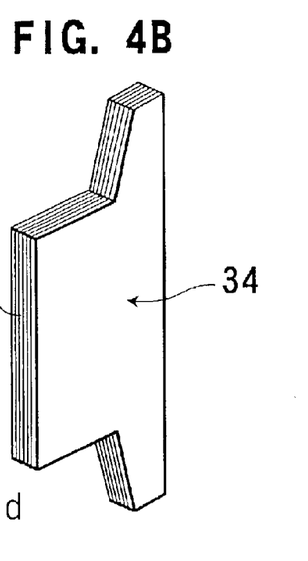
Figure 5:
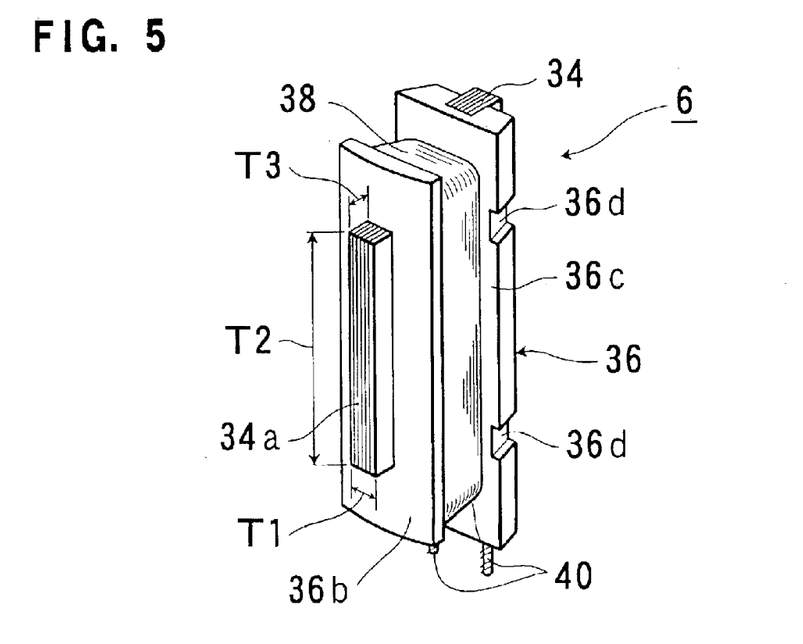
FIG. 5 is a perspective view of the salient pole (assembled including a coil) explained in FIGS. 4A and 4B.

The structure of each of the salient poles 6 will be described below with reference to FIGS. 4A, 4B and 5. In FIGS. 4A, 4B and 5, the constituting parts same as or corresponding to those shown in FIGS. 2 and 3 have the same reference numbers.

The salient poles 6 are each structured such that the pole tooth 34 (FIG. 4B) composed of seven surface-insulated magnetic steel plates stacked on one another, each plate having a thickness of 0.5 mm and punched out to be substantially T-shaped, has its T-letter's vertical (oriented horizontal in the figure) bar portion inserted into a rectangular hole 36a of the resin bobbin 36 (FIG. 4A), and such that the wire 38 is wound on the bobbin 36 between the bobbin flanges 36b and 36c as shown in FIG. 5. The substantially T-shaped pole tooth 34 has a thickness T1, and the vertical bar portion thereof has a width T2 and has a length so as to protrude by a dimension T3 overall from the surface of the bobbin flange 36b when fitted into the hole 36a of the bobbin 36. The wire 38 has its both terminations bound around respective terminal pins 40 attached to the lower end of the bobbin flange 36c. The bobbin flange 36c has, on each of its both sides, two notches 36d, 36d forming resin injection holes 37 (to be described later: see upcoming FIG. 6A) for injecting the molding resin 48 through.

The pole tooth 34 may alternatively be made of a soft magnetic material such as a ceramic molding formed by sintering a soft magnetic powder, and a metallurgic molding formed by sintering a soft magnetic material composed of micro-powder of surface-insulated pure iron. The pole tooth 34 made of a different soft magnetic steel material containing Fe—Ni—Cr series steel not only keeps a high permeability but also has a relatively high electrical resistance thereby reducing its eddy current loss, and at the same time is free from corrosion without rustproof treatment thus being suitable for use in extreme environments such as automotive application.

Figure 6A:
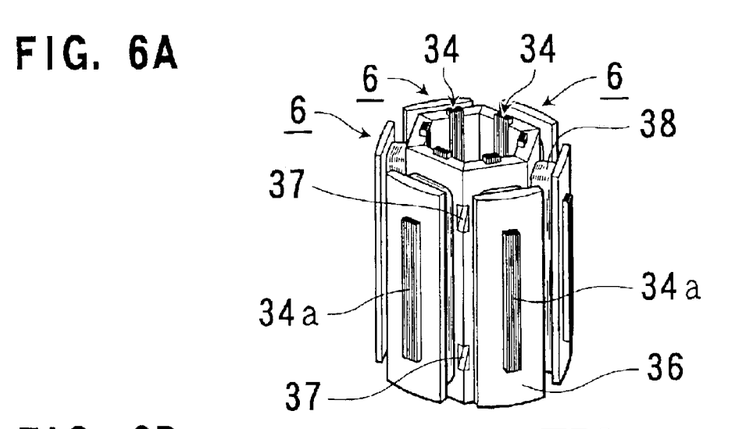
FIG. 6A shows a salient pole assembly with six salient poles arranged circumferentially at even angle intervals of 60 degrees such that their bobbin flanges are in contact with one another.
Figure 6B:
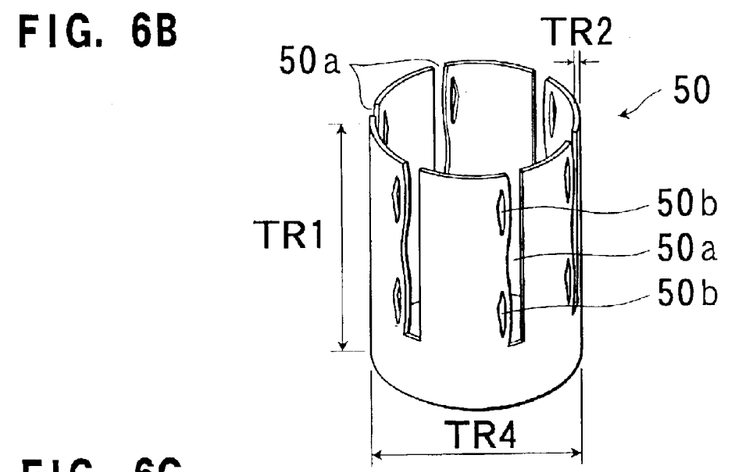
FIG. 6B shows a pole tooth ring.
Figure 6C:
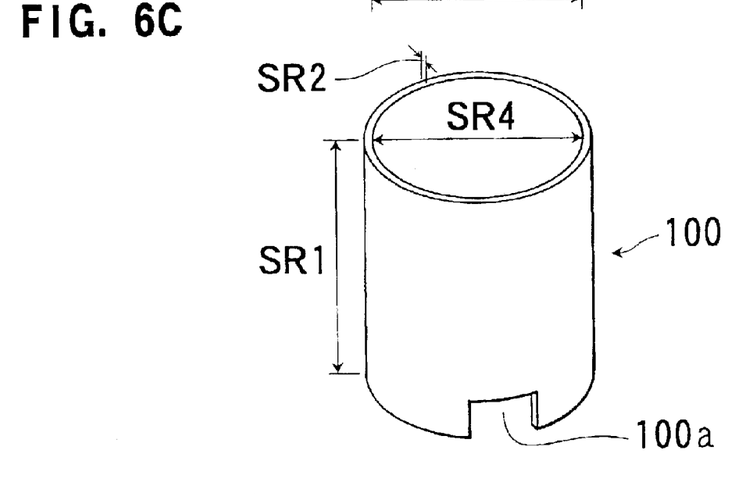
FIG. 6C shows a stator ring.

The structure of the armature assembly 10 will be described below with reference to FIGS. 6A to 6C. In FIGS. 6A to 6C, the constituting parts same as or corresponding to those shown in FIGS. 2 to 5 have the same reference numbers.

Referring to FIG. 6A showing a salient pole assembly, two of the aforementioned resin injection holes 37 are each formed at on the two lateral butting surfaces of two adjacent bobbin flanges 36c, 36c such that one notch 36d of one bobbin flange 36c opposes one notch 36d of the other bobbin flange 36c adjacent to the one bobbin 36c.

FIG. 6B shows the aforementioned pole tooth ring 50 for housing the salient pole assembly shown in FIG. 6A. The pole tooth ring 50 is a hollow cylinder of a soft magnetic steel plate, is produced by, for example, drawing process, and is provided with a plurality of slits as mechanisms for positioning and fixing the salient poles 6 as described later.

FIG. 6C shows the aforementioned stator ring 100 for housing the above described pole tooth ring 50 with the salient pole assembly lodged therein. The stator ring 100, unlike the pole tooth ring 50, is not provided with positioning mechanisms nor fixing mechanisms, and had an inner diameter SR4 equal to or slightly larger than an outer diameter TR4 (see FIG. 6B) of the pole tooth ring 50, so that the pole tooth ring 50 with the salient pole assembly is duly fitted into the stator ring 100. Needless to say, in case of an outer rotor type motor, a stator ring is disposed inside a pole tooth ring.

The stator ring 100 has a length (axial dimension) SR1 equal to or slightly larger than a length TR1 of the pole tooth ring 50, so that the pole tooth ring 50 is housed completely in the stator ring 100. Thus, the stator ring 100 prevents exposure of the mechanisms for positioning and fixing the salient poles, and completely covers the magnetic discontinuity thereby significantly reducing magnetic leakage flux. This naturally enhances also the product appearance quality and decency.

The stator ring 100 has a wall thickness SR2 larger than a wall thickness TR2 of the pole tooth ring 50 because the flanges 12 and 13 (see FIG. 2) are welded respectively to the both ends of the stator ring 100. The wall thickness SR2 of the stator ring 100, however, should be minimized insofar as the flanges 12 and 13 can be duly welded to the stator ring 100. The stator ring 100 is provided with a cutaway 100a for accommodating the connector 47 (see FIG. 2).

The pole tooth ring 50 will be described with reference to FIG. 6B. The pole tooth ring 50 has six slits 50a extending axially (parallel to the shaft 21 (see FIG. 2)) from its one axial end beyond its halfway point and arrayed circumferentially at even intervals. The slits 50a do not necessarily have to be arrayed at even intervals as described above, but may be arrayed at irregular intervals for the purpose of controlling cogging torque.

The slits 50a are each configured such that one side wall thereof is wavy along the configuration of a plurality (two in this embodiment) of openings 50b which are provided along and close to the one side wall, and which make the one side wall elastic or deformable, and the other side wall is straight. The openings 50b may be shaped circular, or oblong, shape thereof not being limited thereto. The one side wall may be made wavy when the openings 50b are formed on the pole tooth ring. Specifically, two cuts are made first along and close to the one side wall, and then forced open to form the openings 50b, thereby making the one side wall wavy. The slit 50a, the opening 50b, and the waviness of the one side wall are dimensioned and configured such that the both side walls of the slit 50a make, with adequate elasticity, firm contact with the end portion 34a of the pole tooth 34 when the pole tooth end portion 34a is fitted into the slit 50a.

The openings 50b are provided along only one side wall of the slit 50a making only the one side wavy in this embodiment, but may alternatively be provided along the both side walls making the both side walls wavy. However, considering the time for providing additional openings along the other side wall and the situation that sufficient elasticity is gained with the openings along only the one side wall, it will be good enough to provide the openings only along the one side wall unless definitely required for some reason.

The six salient poles 6 independently prepared are each duly positioned and fixed such that the end portion 34a of the tooth pole 34 is fitted into each slit 50a formed on the pole tooth ring 50. And, the stator ring 100 of a steel plate is placed so as to house the pole tooth ring 50, thereby forming a magnetic circuit.

Figure 7A:
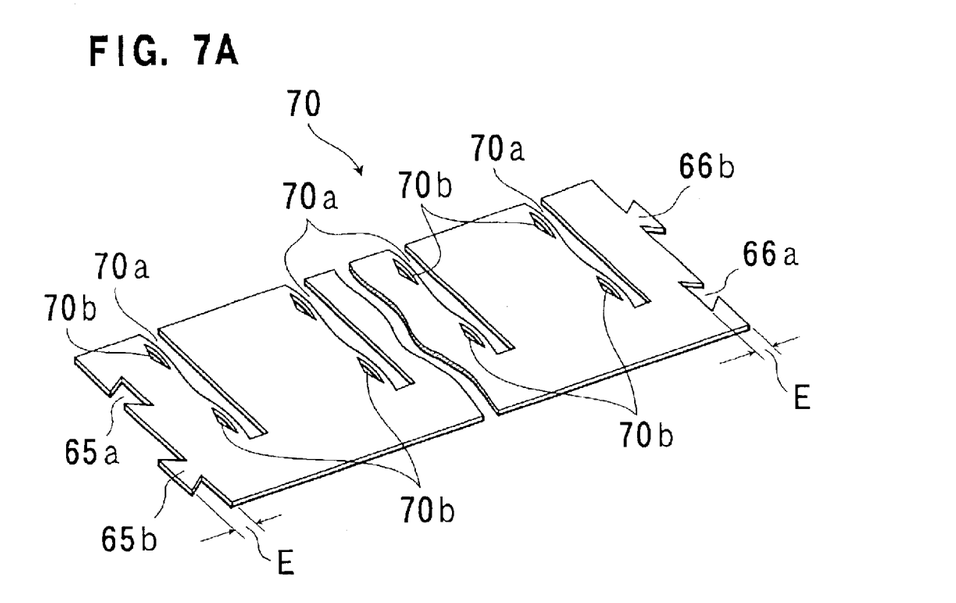
FIGS. 7A and 7B are perspective views of a pole tooth ring of a rotary machine according to a second embodiment of the present invention, respectively showing the pole tooth ring as before and after assembly.
Figure 7B:
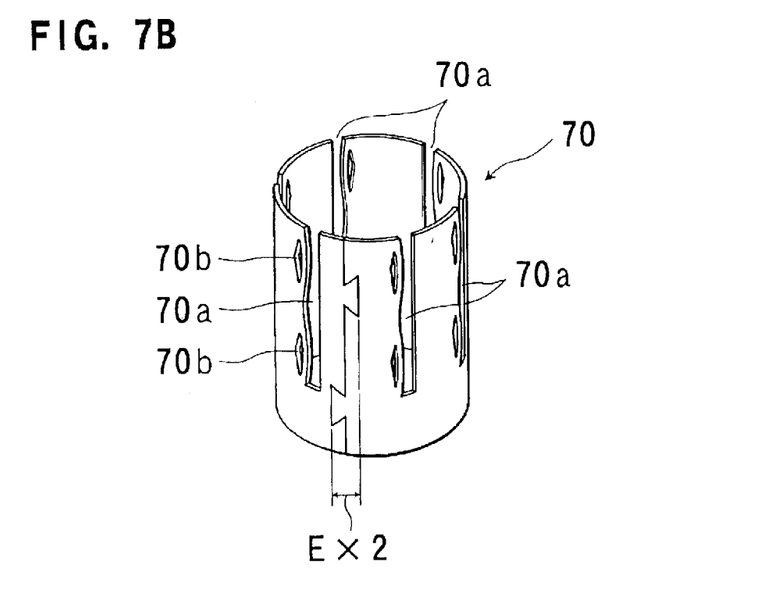

A second embodiment of the present invention will be described with reference to FIGS. 7A and 7B. Referring to FIG. 7A, a soft magnetic steel plate, for example, galvanized, nickelized, or a pure-iron plate, is provided with a plurality (six in this embodiment) of slits 70a punched out at prescribed intervals, and two openings 70b are formed along one side wall of each of the slits 70a thereby making the one side wall wavy in the same way as in the first embodiment. Then, the steel plate thus prepared is rolled up to form a pole tooth ring 70 as shown in FIG. 7B. In this embodiment, the sophisticated process of drawing required in the first embodiment is eliminated.

Referring back to FIG. 7A, one end (left end in the figure) of the steel plate is provided with a cutaway 65a with a depth E and a protrusion 65b with a height E, and the other end (right end in the figure) thereof is provided with a protrusion 66b with a height E and a cutaway 66a with a depth E. The steel plate prepared as shown in FIG. 7A is rolled up and the both ends thereof are joined together such that the cutaway 65a engages with the protrusion 66b and the protrusion 65b engages with the cutaway 66a as shown in FIG. 7B, thereby ensuring high precision on the tooth ring 70 during assembly process. The cutaways and the protrusions do not have to be shaped as shown in FIG. 7A, but may be shaped otherwise. Also, the both ends of the steel plate may be plain without the mating cutaways and protrusions. In this embodiment, one side wall of the slit 70a can be deformed when the end portion 34a of the pole tooth 34 is fitted into the slit 70a.

Figure 8A:
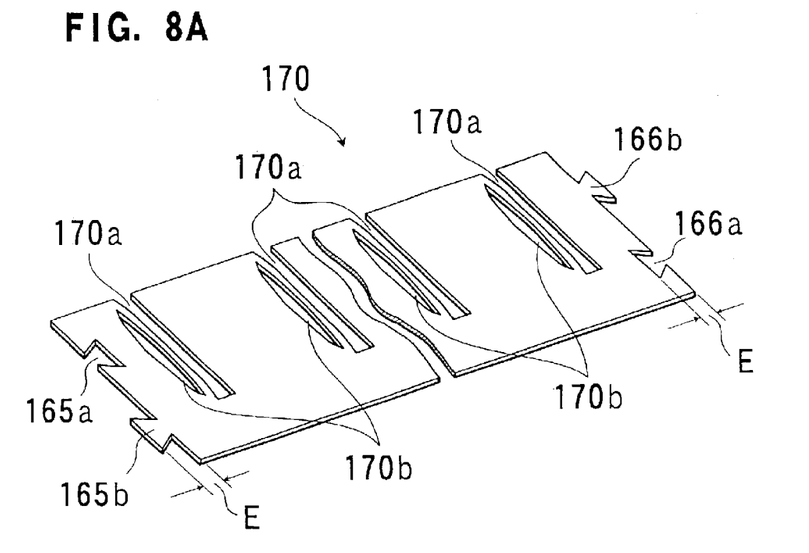
FIGS. 8A and 8B are perspective views of a pole tooth ring of a rotary machine according to a third embodiment of the present invention, respectively showing the pole tooth ring as before and after assembly.
Figure 8B:
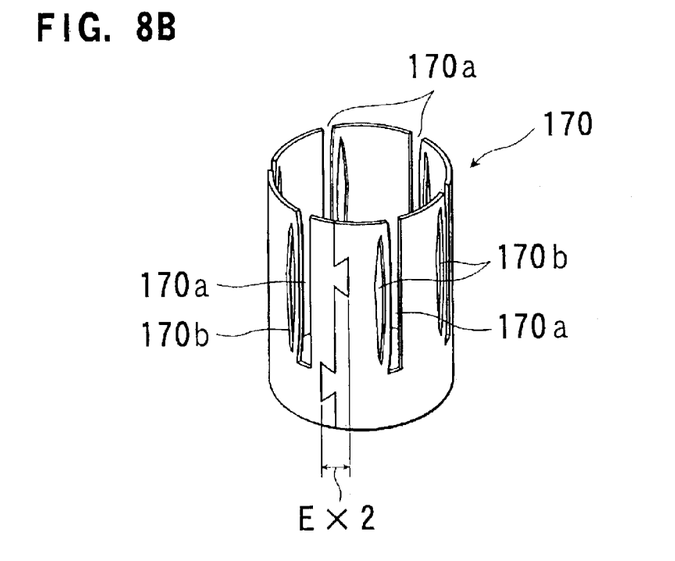

A third embodiment of the present invention is shown in FIGS. 8A and 8B. The difference from the second embodiment is that only one large opening 170b, rather than the two small openings 70b, is formed along one side wall of each of slits 170a.

Figure 9A:
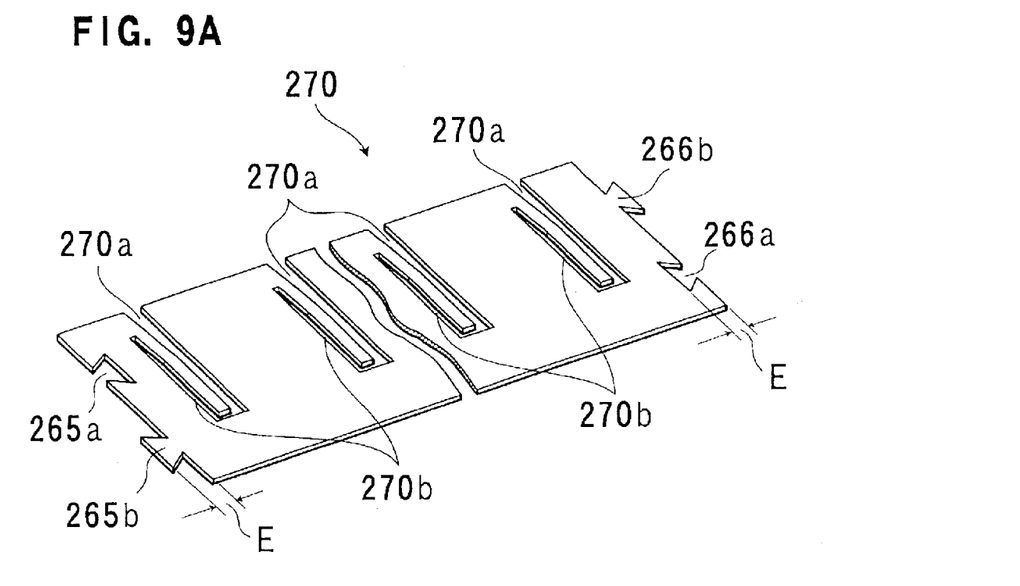
FIGS. 9A and 9B are perspective views of a tooth ring of a rotary machine according to a fourth embodiment of the present invention, respectively showing the pole tooth ring as before and after assembly.
Figure 9B:
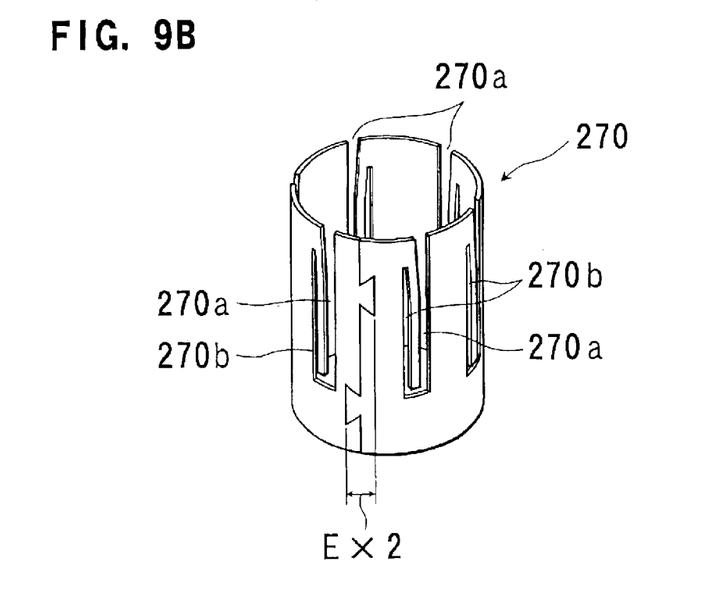

A fourth embodiment of the present invention will be described with reference to FIGS. 9A and 9B. Referring to FIG. 9A, a soft magnetic steel plate (the same materials as those cited for the above described second embodiment is provided with a plurality (six in this embodiment) of slits 270a punched out to be arrayed at prescribed intervals, and is provided also with a plurality (the same number as the slits 270*a*) of openings 270*b* punched out at the same time together with the slits 270*a*, each substantially L-shaped with its longer bar portion oriented parallel with the slit 270*a*, each arranged along and close to the one side wall of the slit 270*a*, and each continuous with the bottom end of the slit 270*a*. Then, the steel plate thus prepared is rolled up to form a pole tooth ring 270 as shown in FIG. 9B. Again in this embodiment, the sophisticated process of drawing required in the first embodiment is-eliminated.

Referring back to FIG. 9A, one end (left end in the figure) of the steel plate is provided with a cutaway 265*a* with a depth E and a protrusion 265*b* with a height E, and the other end (right end in the figure) thereof is provided with a protrusion 266*b* with a height E and a cutaway 266*a* with a depth E. The steel plate prepared as shown in FIG. 9A is rolled up and the both ends thereof are joined together such that the cutaway 265*a* engages with the protrusion 266*b* and the protrusion 265*b* engages with the cutaway 266*a* as shown in FIG. 9B, thereby ensuring high precision on the pole tooth ring 270 during assembly process.

In this embodiment, the L-shaped opening 270*b* oriented parallel with the slit 270*b* and continuous therewith generates elasticity, functioning in the same way as the openings 50*b* and the resultant wavy side wall of the slit 50*a*, whereby the salient pole 6 fitted into the slit 270*a* is firmly fixed with appropriate contact force.

Figure 10A:
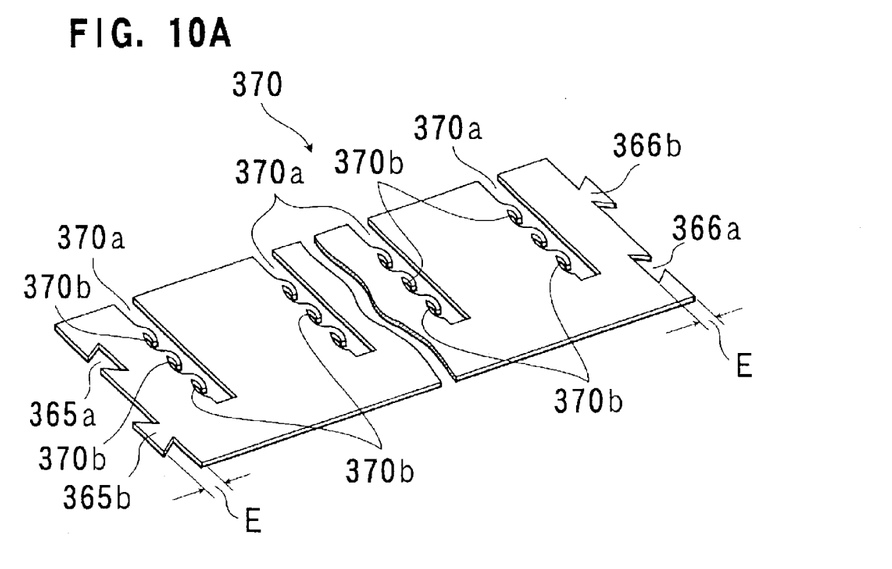
FIGS. 10A and 10B are perspective views of a tooth ring of a rotary machine according to a fifth embodiment of the present invention, respectively showing the pole tooth ring as before and after assembly.
Figure 10B:
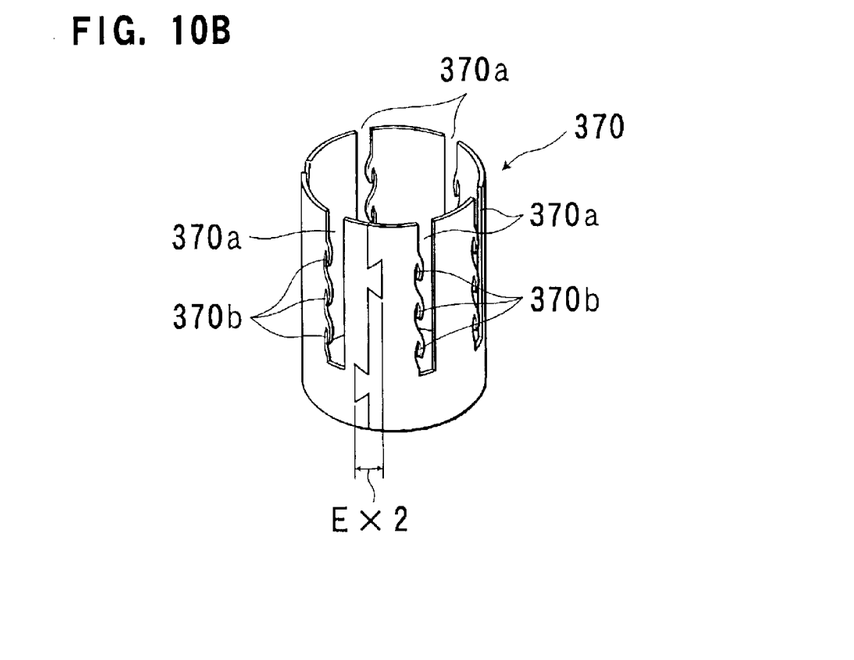

A fifth embodiment of the present invention will be described with reference to FIGS. 10A and 10B. Referring to FIG. 10A, a soft magnetic steel plate (the same materials as those cited for the above described second embodiment) is provided with a plurality (six in this embodiment) of slits 370*a* punched out to be arrayed at prescribed intervals, each slit having a plurality (three in this embodiment) of openings 370*b* arranged along and continuous with its one side wall. Then, the steel plate thus prepared is rolled up to form a pole tooth ring 370 as shown in FIG. 10B. Also in this embodiment, the sophisticated process of drawing required in the first embodiment is eliminated.

Referring back to FIG. 10A, one end (left end in the figure) of the steel plate is provided with a cutaway 365*a* with a depth E and a protrusion 365*b* with a height E, and the other end (right end in the figure) thereof is provided with a protrusion 366*b* with a height E and a cutaway 366*a* with a depth E. The steel plate prepared as shown in FIG. 10A is rolled up and the both ends thereof are joined together such that the cutaway 365*a* engages with the protrusion 366*b* and the protrusion 365*b* engages with the cutaway 366*a* as shown in FIG. 10B, thereby ensuring high precision on the pole tooth ring 370 during assembly process.

In this embodiment, the openings 370*b* generate elasticity, functioning in the same way as the openings 50*b* and the resultant wavy side wall of the slit 50*a*, whereby the salient pole 6 fitted into the slit 370*a* is firmly fixed with appropriate contact force.

What is claimed is:

1. An electric rotary machine comprising:

a cylindrical pole tooth ring provided with a plurality of slits; and a plurality of salient poles each including a pole tooth, and each positioned and fixed such that the pole tooth is fitted into the slit, wherein the cylindrical pole tooth ring includes at least one opening adjacent to each slit, said at least one opening functioning to generate elasticity acting against the pole tooth when the pole tooth is fitted into the slit.

2. An electric rotary machine according to claim 1, wherein the elasticity is generated by means of a plurality of openings provided along and close to at least one side wall of the slit combined with a resultant wavy portion of the at least one side wall.

3. An electric rotary machine according to claim 1, wherein the elasticity is generated by means of at least one opening provided along and continuous with one side wall of the slit.

* * * * *